US007083708B2

(12) United States Patent
Chlistunoff et al.

(10) Patent No.: US 7,083,708 B2
(45) Date of Patent: Aug. 1, 2006

(54) OXYGEN-CONSUMING CHLOR ALKALI CELL CONFIGURED TO MINIMIZE PEROXIDE FORMATION

(75) Inventors: Jerzy B. Chlistunoff, Los Alamos, NM (US); Ludwig Lipp, Brookfield, CT (US); Shimshon Gottesfeld, Niskayuna, NY (US)

(73) Assignee: The Regents of the University of California, Los Alamos, NM (US)

( * ) Notice: Subject to any disclaimer, the term of this patent is extended or adjusted under 35 U.S.C. 154(b) by 536 days.

(21) Appl. No.: 10/631,073

(22) Filed: Jul. 31, 2003

(65) Prior Publication Data

US 2005/0026005 A1 Feb. 3, 2005

(51) Int. Cl.
*C25B 9/10* (2006.01)
(52) U.S. Cl. ............... 204/252; 204/263; 204/265; 204/266
(58) Field of Classification Search ............... 204/252, 204/263, 265, 266
See application file for complete search history.

(56) References Cited

U.S. PATENT DOCUMENTS

| 4,221,644 A | 9/1980 | LaBarre | 204/98 |
|---|---|---|---|
| 4,364,805 A | 12/1982 | Rogers | 204/98 |
| 4,364,806 A | 12/1982 | Rogers | 204/98 |
| 4,500,647 A | 2/1985 | Solomon | 502/101 |
| 4,545,886 A * | 10/1985 | de Nora et al. | 204/252 |
| 4,563,261 A | 1/1986 | Staab et al. | 204/290 |
| 4,752,369 A | 6/1988 | Caldwell et al. | 204/252 |
| 5,035,789 A * | 7/1991 | Beaver et al. | 427/123 |
| 5,047,133 A | 9/1991 | Allen | 204/258 |
| 5,561,000 A * | 10/1996 | Dirven et al. | 429/42 |
| 5,952,119 A | 9/1999 | Wilson | 429/34 |
| 6,117,286 A | 9/2000 | Shimamune et al. | 204/252 |

* cited by examiner

*Primary Examiner*—Bruce F. Bell
(74) *Attorney, Agent, or Firm*—Samuel L. Borkowsky

(57) ABSTRACT

Oxygen-consuming zero gap chlor-alkali cell was configured to minimize peroxide formation. The cell included an ion-exchange membrane that divided the cell into an anode chamber including an anode and a cathode chamber including an oxygen gas diffusion cathode. The cathode included a single-piece of electrically conducting graphitized carbon cloth. Catalyst and polytetrafluoroethylene were attached to only one side of the cloth. When the cathode was positioned against the cation exchange membrane with the catalyst side away from the membrane, electrolysis of sodium chloride to chlorine and caustic (sodium hydroxide) proceeded with minimal peroxide formation.

5 Claims, 4 Drawing Sheets

OXYGEN-CONSUMING CHLOR ALKALI CELL CONFIGURED TO MINIMIZE PEROXIDE FORMATION

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to oxygen-consuming electrochemical cells and more particularly to an oxygen-consuming chlor-alkali cell configured to minimize the formation of peroxide.

BACKGROUND OF THE INVENTION

Chlor-alkali electrolysis involves the electrolysis of sodium chloride to form chlorine gas and sodium hydroxide ("caustic"). Chlor-alkali electrolysis is energy intensive, and the shift in Japan, for example, from a mercury or diaphragm process to an ion-exchange membrane process has reduced environmental problems and provided a tremendous savings in energy (about 40% savings over a period of about 25 years). However, even the most energy efficient, state-of-the-art membrane electrolyzer consumes around 2500 kilowatt-hours (kWh) of electricity to produce one ton of chlorine and additional power savings cannot be attained using the current process. For further energy savings, a drastic change is necessary using, for example, electrode reactions different from conventional ones. The use of gas diffusion electrodes employed in fuel cells may be the most feasible means to provide considerable power savings (See U.S. Pat. No. 6,117,286 to T. Shimamune et al. entitled "Electrolytic Cell Employing Gas Diffusion Electrode, which issued Sep. 12, 2000, incorporated by reference herein).

Gas diffusion electrodes enable a gaseous reactant to be easily fed to the electrodes of the cell. FIG. 1 shows a schematic representation of a configuration of a three-compartment type cell that employs a commonly used type of oxygen gas diffusion cathode. Cell 1 is divided by cation exchange membrane 2 into anode chamber 3 and cathode chamber 4. Cathode chamber 4 is divided by oxygen diffusion cathode 5 into solution chamber 6 and gas chamber 7. Oxygen gas as a starting material is fed from the gas chamber 7 side to the gas phase side of oxygen gas diffusion cathode 5. The oxygen gas diffuses through the oxygen gas diffusion cathode 5 and reacts with water (and electrons) in the catalyst layer of cathode 5 to generate sodium hydroxide. Gas diffusion cathode 5 is of the so-called gas/liquid separation type, which is permeable to oxygen and prevents sodium hydroxide from moving from solution chamber 6 to gas chamber 7. The oxygen gas diffusion cathodes that have been proposed so far as electrodes for chlor-alkali electrolysis satisfying this requirement are mostly gas diffusion electrodes produced by mixing carbon powder with PTFE, molding the mixture into a sheet to obtain an electrode base, and depositing a catalyst, e.g. silver or platinum, on the base.

In conventional sodium chloride electrolysis, the anodic and cathodic reactions are as follows:

Anodic reaction: $2Cl^- \rightarrow Cl_2 + 2e$ (1.36 V).

Cathodic reaction: $2H_2O + 2e \rightarrow 4OH^- + H_2$ (−0.83 V).

Thus, the theoretical thermodynamic decomposition voltage is 2.19 V.

When the above electrolysis is conducted while feeding oxygen to the cathode, the following cathodic reaction occurs:

Cathodic reaction: $2H_2O + O_2 + 4e \rightarrow 4OH^-$ (0.40 V).

Thus, when an oxygen reduction reaction not involving hydrogen generation is used in place of the hydrogen generation reaction at the cathode in the conventional processes, the theoretical decomposition voltage decreases from 2.19 V (the conventional value) to 0.96 V. In theory, at least, a decrease in the decomposition voltage of 1.23 V (the difference between the thermodynamic potentials) is possible. In practice, however, the actual difference in cell voltage between hydrogen-evolving and oxygen-consuming cells can differ substantially from 1.23 V. This can be traced to the high temperatures (80–90° C.) required for chlor-alkali electrolysis, to differences in the kinetics of the hydrogen-evolving and oxygen-consuming chemical reactions, and also to differences in cell design. In any case, oxygen-consuming membrane cells offer a significant energy savings when compared to state-of-the-art hydrogen-evolving membrane cells. With this in mind, attempts have been undertaken worldwide to lower the energy consumption of chlor-alkali electrolysis by replacing a hydrogen-evolving cathode with a gas-diffusion type oxygen-consuming electrode.

For the three-compartment cell of FIG. 1, oxygen gas diffusion cathode 5 separates oxygen from sodium hydroxide; oxygen passes through one side of cathode 5 while sodium hydroxide generated exits the other side of cathode 5. A significant disadvantage of the three-compartment cell relates to the electrical energy loss resulting from the ohmic drop across the sodium hydroxide in between cathode 5 and the cation exchange membrane 2. The problem due to ohmic drop is minimized in a zero-gap electrolytic cell, a representation of which is shown in FIG. 2. In contrast to the cell of FIG. 1, zero-gap electrolytic cell 8 of FIG. 2 does not include the solution chamber in between the cathode and cation exchange membrane. Instead, zero-gap cell 8 includes an oxygen gas diffusion cathode 9 and an ion-exchange membrane 10 that are intimate contact with each other. Oxygen gas and water are fed as starting materials, and sodium hydroxide as a reaction product is recovered from the same side of cathode 9.

There are practical current density limits for membrane, hydrogen-evolving cells. Many hydrogen-evolving cells operate at an optimum current density of about 4 kA/m², which provides a reasonable rate of generation of sodium hydroxide and chlorine gas, and with a high current efficiency. Oxygen-consuming membrane cells may also operate at this current density, but at a lower voltage, typically about 0.9 V lower than the voltage for a hydrogen-evolving membrane cell.

Oxygen gas diffusion cathodes suitable for use in a zero gap cell of the type shown in FIG. 2 should have high gas permeability, high hydrophobicity to avoid wetting by sodium hydroxide, and high permeability for sodium hydroxide to exit the electrode.

Platinum is considered the best catalyst for the complete 4-electron reduction of oxygen. However, due to its high cost, pure platinum is generally not used. Pure silver, carbon-supported silver, and carbon-supported platinum, among other catalysts, have been tried as less costly alternatives. A disadvantage of carbon-supported catalysts is that carbon may provide an energetically favorable path for the electrochemical reduction of oxygen to peroxide according to the following equation:

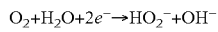

$$O_2 + H_2O + 2e^- \rightarrow HO_2^- + OH^-$$

Peroxide is an unwanted impurity in the caustic stream, and its precipitation as sodium peroxide according to the following equation can cause liquid flow maintenance problems and damage the oxygen gas diffusion cathode:

$$HO_2^- + 2Na^+ + OH^- \rightarrow Na_2O_2 + H_2O$$

Minimizing the generation of peroxide is of primary importance and highly desirable because peroxide can obstruct the cell operation and damage the oxygen diffusion cathode.

Therefore, an object of the present invention is to provide an oxygen-consuming chlor-alkali cell configured to minimize the formation of peroxide.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the objects and purposes of the present invention, as embodied and broadly described herein, the present invention includes an oxygen consuming zero-gap electrolytic cell configured to minimize the formation of peroxide. The cell includes an ion-exchange membrane partitioning the cell into an anode chamber including an anode and a cathode chamber including an oxygen gas diffusion cathode. The gas diffusion cathode includes a single-piece of electrically conducting graphitized carbon cloth having a first side and a second side. Catalyst and polytetrafluoroethylene are attached to the first side but substantially not to the second side, and the cathode is oriented with the second side adjacent to the ion-exchange membrane.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

For a zero gap, oxygen consuming chlor alkali cell employing a carbon gas diffusion cathode with carbon supported metal catalyst, concentrated sodium hydroxide can create suitable conditions for oxygen reduction on the carbon support that could lead to significant generation of unwanted peroxide. It has now been found that peroxide generation can be minimized in an oxygen consuming zero-gap chlor alkali cell employing a gas diffusion cathode of a single piece of carbon cloth with catalyst dispersed in hydrophobic polytetrafluoroethylene on only one side of the of the carbon cloth, and when the substantially catalyst/PTFE free side is in contact with the cationic ion exchange membrane of the cell.

Briefly, the present invention includes an oxygen consuming, zero-gap chlor-alkali cell configured to minimize the generation of peroxide during operation. The invention includes a gas diffusion cathode prepared from a single piece of graphitized, electrically conducting carbon cloth support. Attached to one side of the support is a mixture of catalyst (Pt/C) and polytetrafluoroethylene (PTFE). The other side is substantially free of catalyst and PTFE. The cathode is positioned with the side substantially free of catalyst and PTFE in contact with the cation exchange membrane. In this configuration, only a minimal amount of peroxide was detected during chlor alkali electrolysis. This invention cell produced less peroxide than a comparison cell employing a commercially available gas diffusion electrode, and less peroxide even when the commercially available electrode was used with a hydrophilic spacer that separated the electrode from the cation exchange membrane of the cell.

Figure 1:
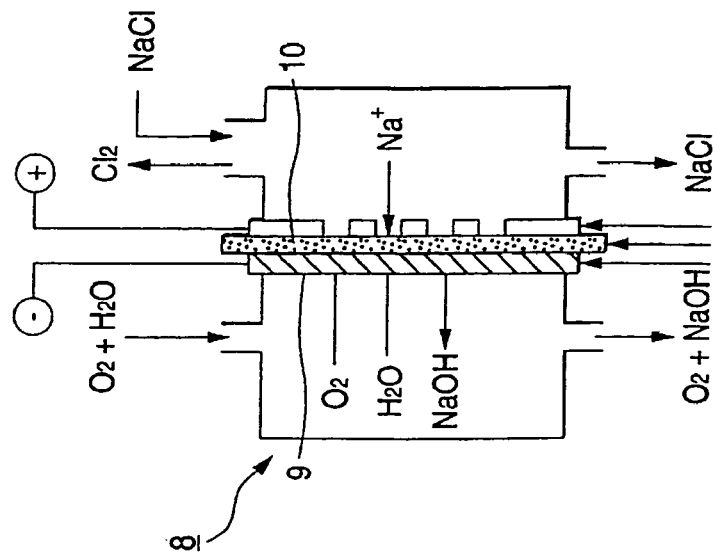
FIG. 1 shows a schematic representation of a conventional three-compartment type cell for sodium chloride electrolysis.
Figure 2:
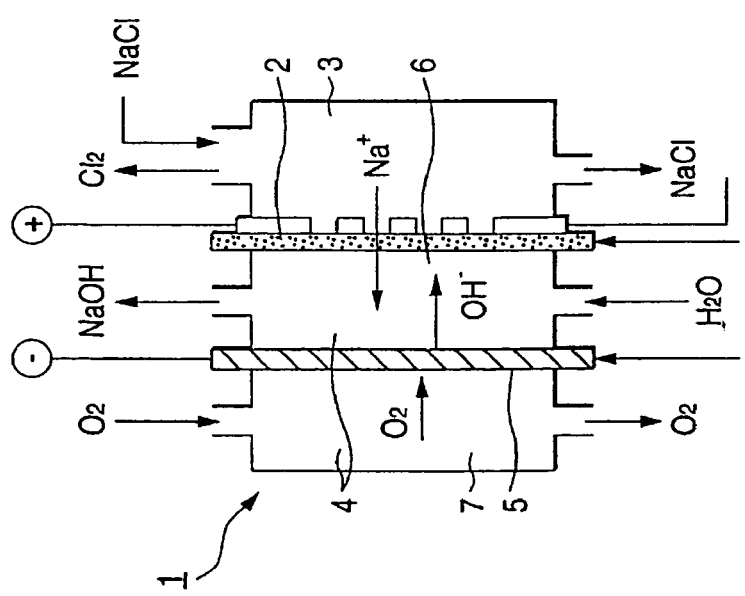
FIG. 2 shows a schematic representation of conventional zero-gap cell for sodium chloride electrolysis.
Figure 3:
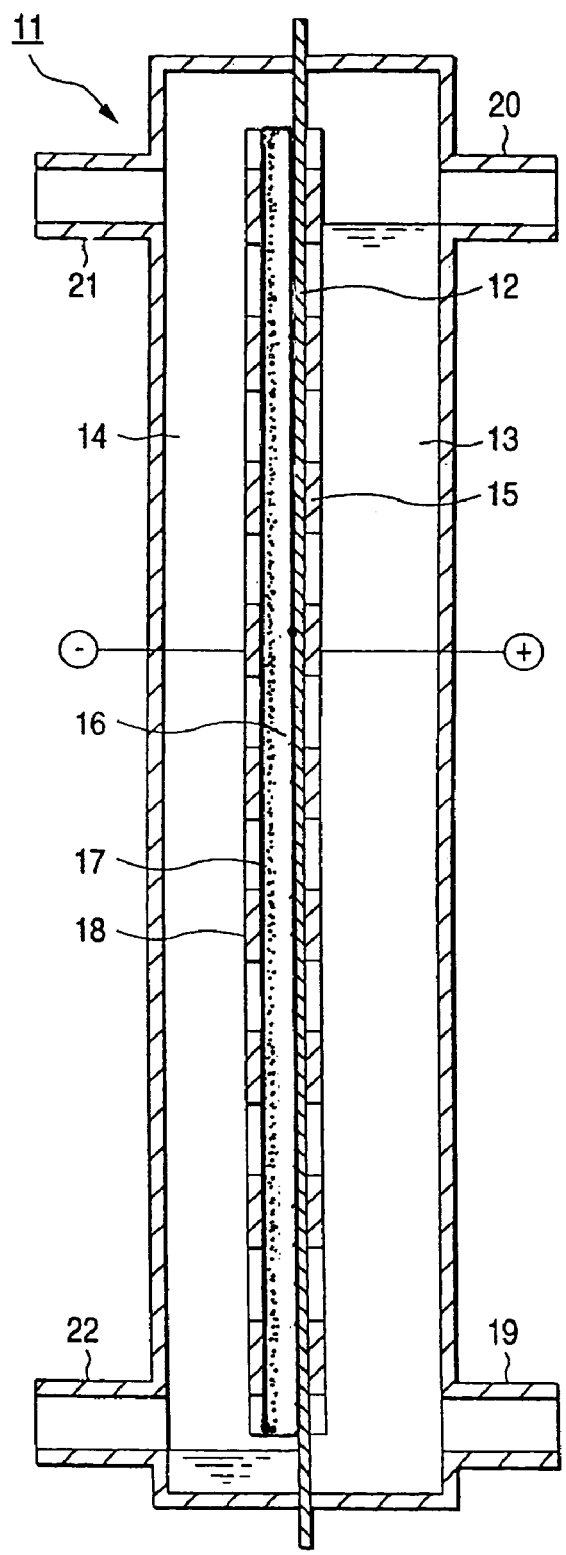
FIG. 3 is a vertical sectional view of a zero-gap cell for sodium chloride electrolysis according to the invention.

The practice of the invention can be further understood with the accompanying figures. Similar or identical structure is identified using identical callouts. A representation of an invention cell is shown in FIG. 3. The electrolytic cell 11 is divided by ion exchange membrane 12 into anode chamber 13 and cathode chamber 14. The cell has a mesh-form insoluble anode 15 in intimate contact with cation exchange membrane 12 on the anode chamber 13 side thereof. The cell has an oxygen diffusion cathode 16 in intimate contact with cation exchange membrane 12 on the cathode chamber 14 side thereof. Oxygen diffusion cathode 16 includes a single piece of graphitized carbon cloth support. A mixture of particles of platinum on carbon catalyst and PTFE are attached to side 17 of the support. The other side of the support is substantially free of catalyst and PTFE, and the cathode is oriented with the side substantially free of catalyst and PTFE in contact with cation exchange membrane 12. Current collector/flow field 18 is in contact with the catalyst containing side of oxygen diffusion cathode 16, and electricity is supplied through collector/flow field 18.

The cell includes inlet 19 for a saturated aqueous solution of sodium chloride in a side wall part near the bottom of the anode chamber, and an outlet 20 for unreacted sodium chloride solution and product chlorine gas in a side wall part near the top part of the anode chamber. The cell also includes inlet 21 for humidified oxygen-containing gas in a side wall part near the top of the cathode chamber, and outlet 22 for sodium hydroxide and excess oxygen in a side wall part near the bottom of the cathode chamber.

When current is passed through electrodes 15 and 16 of the cell while feeding saturated aqueous sodium chloride solution to the anode chamber 13 and feeding humidified oxygen gas to the cathode chamber 14, sodium hydroxide is generated at cathode 16.

The cathode used to demonstrate the invention includes a single piece, plain weave, graphitized carbon cloth support about 0.35 mm in thickness with a mass of about 116 g/m$^2$ and a density of about 1.75 g/cm$^3$. The catalyst used was platinum supported on carbon (Pt/C) particles. The catalyst composition more particularly included about 80% Pt by weight (platinum particles of about 25 nanometers) and about 20% carbon (VULCAN® XC72) particles by weight. The platinum loading was about 5 mg/cm$^2$.

For comparison purposes, the rate of peroxide generation for the invention cell was compared to that for cells employing a commercially available ELAT® electrode (available from E-TEK®). The particular ELAT® electrode used was loaded on one side with a mixture of PTFE and catalyst (80% Pt on carbon (VULCAN® XC72), with a total Pt loading of 5 mg/cm$^2$), and on the other side with carbon and PTFE. The rate of peroxide generation was determined for a cell employing the ELAT® electrode, and also using for a cell employing the ELAT® electrode in combination with a hydrophilic carbon cloth (PANEX® 30) spacer that separated the ELAT® electrode from cation exchange membrane 12. Chlor alkali cells employing carbon cloth spacers have been described in U.S. Pat. No. 6,117,286 to T. Shimamune et al. vide supra, but no report on the production of hydrogen peroxide was mentioned.

Unless otherwise stated, the following experimental conditions were employed. The geometric area of all cathodes was 50 cm$^2$. Each cell was equipped with a gold plated nickel or stainless steel flow-field that remained in intimate contact with the gas diffusion electrode on one side and with a gold-plated nickel or stainless steel current collector on the other side (FIG. 3). The cation permeable membrane used was an ACIPLEX® F4232 (ASAHI KASEI) bi-layer membrane. The anode, anode flow-field and current collector were made of DSA-coated titanium. Humidified oxygen (0.5 cm$^3$ of water per minute) was delivered to the cathode at 20 psig pressure at a flow rate corresponding to 5 times the theoretical amount of oxygen. The operating temperature of each cell was 90° C. A brine recirculation system provided an input brine concentration to the cell of about 200 g/l.

Figure 4:
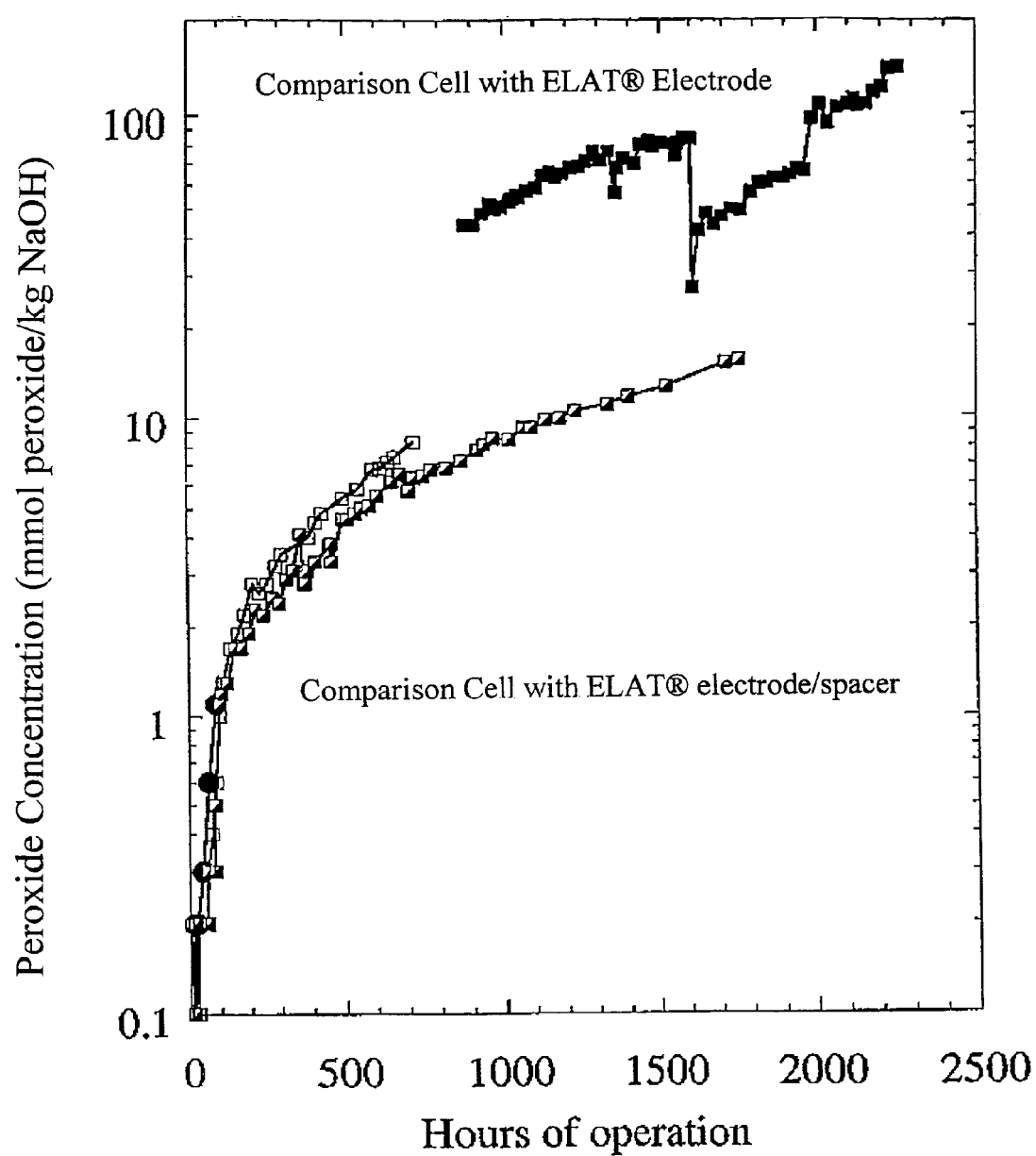
FIG. 4 shows graphs of the rate of peroxide generation for non-invention chlor alkali cells; the upper trace is for a chlor alkali cell employing a double sided ELAT® gas diffusion cathode (80% Pt/C catalyst on one sides, carbon and PTFE on the other side, 50 cm² cathode area, 5 mg/cm² catalyst loading) and the bottom traces are for cells employing the ELAT® electrode and a hydrophilic carbon spacer (PANEX-30) in between the ELAT® electrode and the cation exchange membrane of the cell.

FIG. 4 shows a log graphical representation of peroxide concentration versus hours of operation for the comparison cells employing the ELAT® electrode. The peroxide concentration is expressed in millimoles (mmol) of peroxide per kilogram (kg) of aqueous caustic, wherein caustic concentration varies from about 10% to about 30% caustic in water. The upper curve was obtained for a cell employing the ELAT® gas diffusion cathode with the catalyst side in contact with the cation exchange membrane. The lower set of three curves was obtained for cells equipped with an ELAT® gas diffusion cathode facing the same way and hydrophilic carbon cloth spacer (PANEX-30) in between the gas diffusion cathode and the cation exchange membrane. For the lower curves for about first 100 hours of operation, the current density was increased from about 2.0 kA/m$^2$ to about 10 kA/m$^2$; afterwards, the current density remained at 10 kA/m$^2$. The data plotted as the upper curve of FIG. 4 are for a current density of 10 kA/m$^2$. The discontinuity in the upper curve at about 1600 hours of cell operation is due to a power outage. As FIG. 4 shows, the carbon cloth hydrophilic spacer significantly reduces the rate of peroxide generation.

Figure 5:
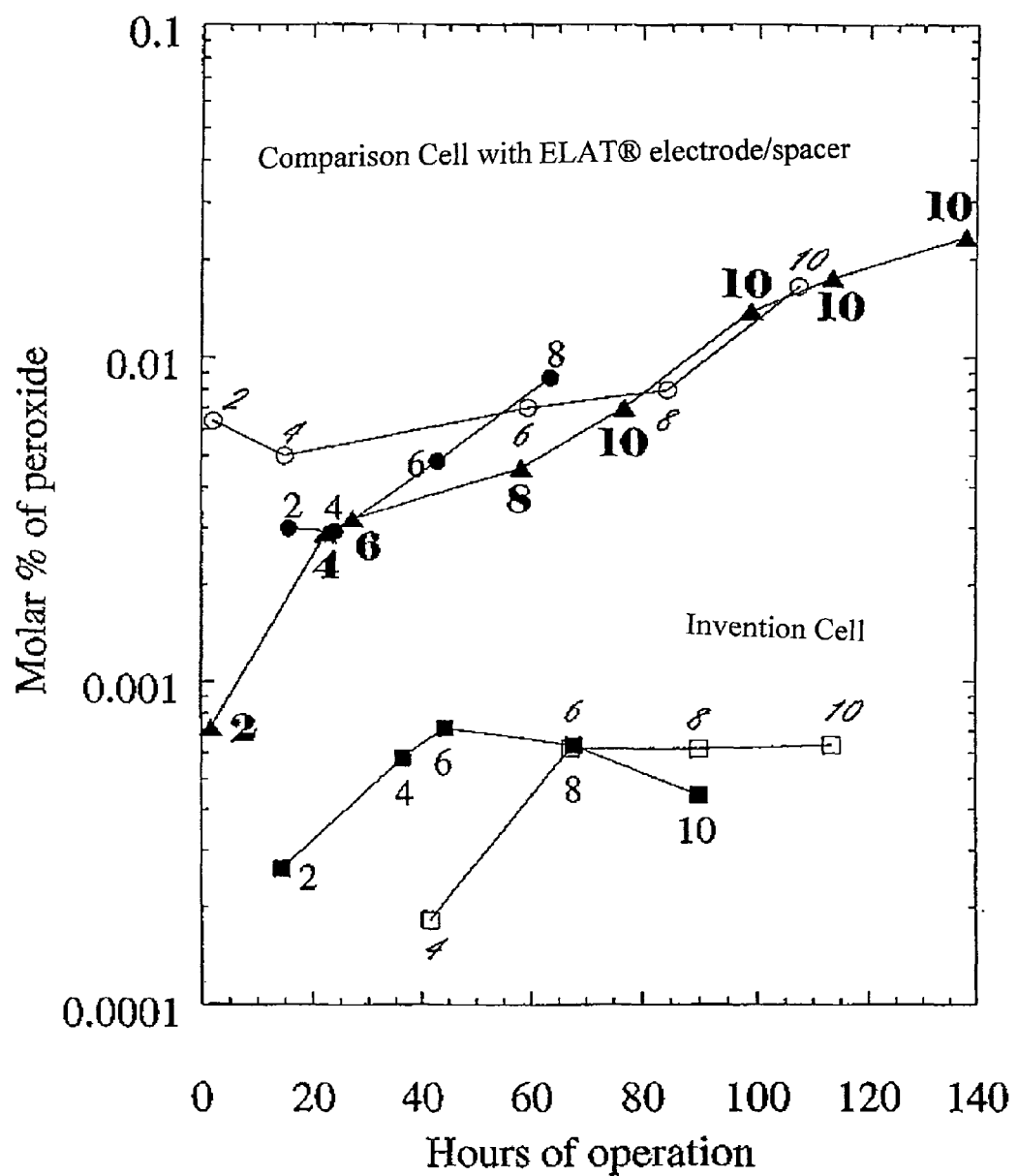
FIG. 5 compares the rate of peroxide generation for the cells employing the ELAT® electrode and carbon spacer shown in FIG. 4 with the rate of peroxide generation for an invention cell where the upper three curves are for the ELAT® and spacer and the lower two curves are for the invention cell employing a single piece, single sided gas diffusion electrode (80% Pt/C catalyst on only side, 50 cm² cathode area, 5 mg/cm² catalyst loading); the numbers 2, 4, 6, 8, and 10 indicate current densities in units of kA/m² at the corresponding experimental points.

While not intending to be bound by any particular explanation, it is believed that the carbon cloth spacer provides an alternative route for the caustic to escape. This reduces the residence time of caustic in the electrode where partial reduction of oxygen to form peroxide can occur FIG. 5 compares the rate of peroxide generation for the above described comparison cell (ELAT® electrode with carbon cloth spacer) to the rate of peroxide generation for a cell of the invention employing a gas diffusion electrode of a single piece of carbon cloth having PTFE and platinum on carbon catalyst on only one side. The data for these curves is shown in Table 1 (comparison cell) and Table 2 (invention cell) below.

TABLE 1[a,b]

| | Cell #1 | | | Cell #2 | | | Cell #3 | | |
|---|---|---|---|---|---|---|---|---|---|
| Current density (kA/m$^2$) | Time (hours) | Cell Voltage (Volts) | Na$_2$O$_2$ conc. (Mol %) | Time (hours) | Cell Voltage (Volts) | Na$_2$O$_2$ conc. (Mol %) | Time (hours) | Cell Voltage (Volts) | Na$_2$O$_2$ conc (Mol %) |
| 2 | 1.7 | 1.703 | 0.000719[c] | 15.7 | 1.707 | 0.00299 | 2.0 | 1.694 | 0.00638[f] |
| | 22.3 | | 0.00286[d] | | | | | | |
| | 26.5 | | 0.00260[e] | | | | | | |
| 4 | 27.2 | 1.983 | 0.00320 | 24.0 | 1.946 | 0.00292 | 14.9 | 1.928 | 0.00500[f] |
| | 57.6 | | 0.00310 | | | | | | |
| 6 | 58.4 | 2.129 | 0.00459 | 43.0 | 2.146 | 0.00481 | 59.6 | 2.133 | 0.00701[f] |
| | 76.0 | | 0.00504 | | | | | | |
| 8 | 76.9 | 2.316 | 0.00702 | 63.7 | 2.326 | 0.00871 | 84.5 | 2.316 | 0.00796 |
| | 89.6 | | 0.00874 | | | | | | |
| 10 | 98.9 | 2.581 | 0.0139 | | 2.521 | | 107.3 | 2.517 | 0.01650 |
| | 113.5 | | 0.0175 | | | | | | |
| | 138.0 | | 0.0234 | | | | | | |

[a]time of peroxide determination as measured from beginning of run
[b]cell voltages are averaged over time of continuous operation of the cell at a given current density
[c]O$_2$ pressure 3 psig, humidification 0.8 cm$^3$/min
[d]O$_2$ pressure 10 psig, humidification 0.8 cm$^3$/min
[e]humidification 0.8 cm$^3$/min
[f]humidification 1.5 cm$^3$/min TABLE 2[a]

| Current density (kA/m$^2$) | Cell #4 | | | Cell #5 | | |
|---|---|---|---|---|---|---|
| | Time (hours) | Average cell voltage[b] (Volts) | Na$_2$O$_2$ conc. (Mol %) | Time (h) | Average cell voltage[a] (Volts) | Na$_2$O$_2$ conc. (Mol %) |
| 2 | 23.0 | 1.716 | 0.00 | 14.4 | 1.721 | 0.000263 |
| 4 | 41.6 | 2.003 | 0.000182 | 36.4 | 1.984 | 0.000582 |
| 6 | 67.3 | 2.244 | 0.000622 | 44.5 | 2.232 | 0.000719 |
| 8 | 90.0 | 2.468 | 0.000619 | 67.8 | 2.477 | 0.000635 |
| 10 | 113.3 | 2.708 | 0.000633 | 89.9 | 2.713 | 0.000446 |

[a]time of peroxide determination as measured from the beginning of the run.
[b]cell voltages are averaged over time of continuous operation of the cell at a given current density.

Peroxide concentrations in FIG. 5 take into account the effect of humidification on the concentration of caustic (i.e. sodium hydroxide). The numbers 2, 4, 6, 8, and 10 shown for a particular curve represent the current density (kA/m$^2$) at an experimental point on that curve. For clarity purposes some experimental points were omitted. Table 1 and Table 2 provide the average voltage measured at a particular current density. As FIG. 5 clearly shows, the invention cell (cells #4 and 5 in Table 2) generates significantly less peroxide than the comparison cells (cells #1, 2, and 3 in Table 1) equipped with ELAT® electrodes and carbon cloth spacers.

The foregoing description of the invention has been presented for purposes of illustration and description and is not intended to be exhaustive or to limit the invention to the precise form disclosed, and obviously many modifications and variations are possible in light of the above teaching. The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An oxygen consuming zero-gap electrolytic cell configured to minimize the formation of peroxide comprising an ion-exchange membrane partitioning the cell into an anode chamber including an anode and a cathode chamber including an oxygen gas diffusion cathode, the oxygen gas diffusion cathode comprising a single-piece of electrically conducting graphitized carbon cloth having a first side and a second side, wherein catalyst and polytetrafluoroethylene are attached to said first side but not to said second side, and wherein said cathode is oriented with said second side adjacent to said ion-exchange membrane.

2. The cell of claim 1, wherein said catalyst comprises platinum supported on carbon.

3. The cell of claim 2, wherein said catalyst comprises about 80% platinum and about 20% carbon.

4. The cell of claim 3, further comprising a catalyst loading of about 5 mg/cm$^2$.

5. The cell of claim 1, wherein said cation-selective ion permeable membrane comprises a sulfonate-containing polymer layer facing said anode and a carboxylate-containing polymer layer facing said gas diffusion cathode.

* * * * *